United States Patent [19]

Kitzing et al.

[11] 3,779,937

[45] Dec. 18, 1973

[54] OPTICAL FILTER LAYER

[75] Inventors: Rainer Kitzing, Villars-sur-Glane; Max Marthaler, Marly-le-Petit; Alfred Oetiker, Fribourg, all of Switzerland

[73] Assignee: Ciba-Geigy AG, Basel, Switzerland

[22] Filed: Dec. 27, 1972

[21] Appl. No.: 318,814

[30] Foreign Application Priority Data

Dec. 31, 1971 Switzerland ........................ 19241/71

[52] U.S. Cl. ........................................ 252/300, 96/20

[51] Int. Cl. ............................ F21v 9/02, G02b 5/20

[58] Field of Search ................. 252/300; 96/20, 137

[56] References Cited

UNITED STATES PATENTS

| | | | |
|---|---|---|---|
| 2,307,916 | 1/1943 | Brooker | 96/135 |
| 3,082,114 | 3/1963 | Balai et al. | 252/300 |
| 3,157,507 | 11/1964 | Bruengger et al. | 96/20 |

*Primary Examiner*—Norman G. Torchin
*Assistant Examiner*—J. P. B. Brammer
*Attorney*—Joseph G. Kolodny et al.

[57] ABSTRACT

Optical filter layer containing in polyvinyl alcohol a filter dyestuff of the formula

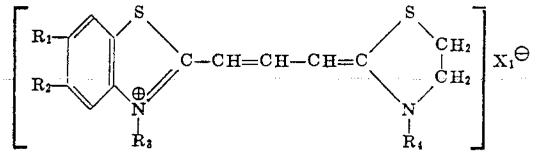

wherein $R_1$ and $R_2$ denote hydrogen atoms, halogen atoms or lower alkyl groups, $R_3$ and $R_4$ denote hydrocarbon radicals which may carry further substituents and $X_1$ denotes an anion. The filter layers possess a very good fastness to light.

7 Claims, 5 Drawing Figures

OPTICAL FILTER LAYER

Figure 1:
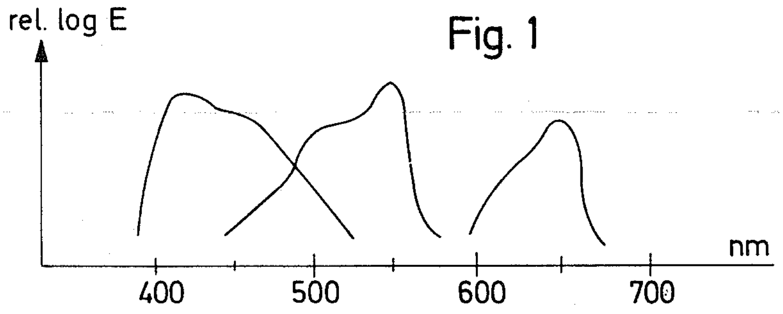

Colour originals can either be copied successively with blue, green or red copying light or, preferably, by a single exposure with white light, onto colour copying materials. The copying material as a rule carries an upper layer sensitive to blue, a middle layer sensitive to green and a lower layer sensitive to red. On exposure to white light (so-called "subtractive" copying method) the layer sensitive to blue should only respond in a part of the spectrum (for example 400 – 500 nm), whilst the layer sensitive to green should only respond in another part of the spectrum (for example 500 – 600 nm). To avoid an overlap (cross-talk) of the sensitivities, it is customary to use an orange filter which is cast onto the material or is pushed, as a separate filter, into the path of the beam of the copying instrument and which filters out of the white light the wavelengths where sensitivities overlap.

In this way, an improved blue-green separation is obtained. Such a process is described, for example, in French Patent Specification 1,248,376.

The more the sensitivity of the layer sensitive to blue and of the layer sensitive to green overlap, the more important it is to use an effective orange filter. The overlap is particularly troublesome if attempts are made to increase the sensitivity of a silver bromide emulsion layer which is sensitive to blue by adding a blue sensitiser or by using a silver bromide emulsion containing iodine. In fact, these measures not only lead to the desired increase in sensitivity but also to an undesired broadening of the sensitivity range towards longer wavelengths, for example as far as 520 nm.

The overlap of the sensitivities is also very particularly troublesome if the layers are dyed in their sensitivity range, either with filter dyestuffs to increase the image sharpness or with image dyestuffs such as are used in the silver dye bleach process. Thus, in a layer sensitive to blue, dyeing with a yellow dyestuff depresses the sensitivity in the short-wavelength blue region, whereby the sensitivity in the long-wavelength blue region is relatively accentuated. Similarly, dyeing a layer sensitive to green with a magenta dyestuff depresses the sensitivity in the absorption range of this dyestuff, for example at 540 to 560 nm, whereby the sensitivity in the boundary regions, for example at 490 to 510 and 570 to 600 nm, is relatively accentuated.

For the reasons which have been given, it has proved necessary, for copying colour images with white light onto copying materials with overlapping blue-green sensitivities, especially onto copying materials with a layer sensitive to blue and dyed yellow and a layer sensitive to green and dyed magenta, to insert into the path of the beam of the copying light a copying filter which possesses a narrow absorption band at about 500 nm but possesses a high transmission outside the absorption band. The condition of having the narrow absorption band and the high transmission results from the fact that at shorter and longer wavelengths the absorption of the yellow and magenta image dyestuffs already influence the sensitivity of the emulsion so unfavourably that an additional light absorption by the copying filter must be avoided in these regions.

This condition is fulfilled by the dyestuffs of the formula (1)
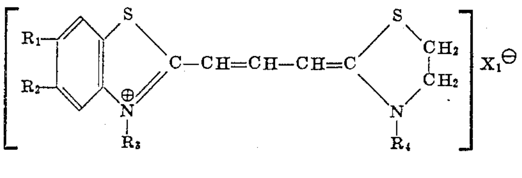

In the formula (I), $R_1$ and $R_2$, independently of one another, denote a hydrogen atom, an alkyl group with at most 4 carbon atoms or a halogen atom and $R_3$ and $R_4$, independently of one another, each denote a hydrocarbon radical which is optionally substituted further, and $X_1$ denotes an anion.

Though these filter dyestuffs are optically ideal, they possess only an inadequate fastness to light in the customary layer materials. In continuous operation, they therefore had to be replaced frequently. Surprisingly, it has now been found that the fastness of light of these dyestuffs can be improved ten-fold to hundred-fold if they are embedded in polyvinyl alcohol instead of in gelatine. Appropriately, a polyvinyl alcohol is used which is manufactured by extensive saponification of polyvinyl acetate and contains at most 3 mol per cent of acetyl groups. The dyestuffs can be stirred into the aqueous solution of the polyvinyl alcohol in the form of a solution, for example in methanol. This is appropriately done at 40°C and in concentrations of 0.5 to 5 percent. In accordance with the desired optical density the amounts, relative to the dry polyvinyl alcohol, can vary within certain limits, for example 0.1 to 1 percent. This yields mixtures which can be filtered perfectly and show no turbidity whatsoever. For technical reasons concerned with casting it is adivsable to add a gelling agent for the polyvinyl alcohol when manufacturing the filter layer from the dyestuff and the aqueous polyvinyl alcohol. As is known, electrolytes, such as ammonium sulphate, aluminum sulphate, tannin and aluminium triformate have a more or less pronounced coagulating action on polyvinyl alcohol. The preferred gelling agent or coagulating agent is sodium borate (borax).

Amongst the dyestuffs of the formula (1), those of the formula (2)
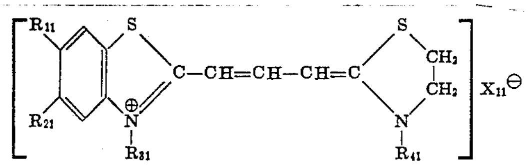

wherein $R_{11}$ and $R_{21}$, independently of one another, denote a hydrogen atom, a methyl group, an ethyl group, a chlorine atom or a bromine atom, $R_{31}$ and $R_{41}$, independently of one another, denote an alkyl group with at most 18 carbon atoms, a lower hydroxyalkyl group or alkylcarboxylic acid group, and $X_{11}$ denotes a chloride, bromide, iodide or perchlorate ion, are particularly effective.

Further dyestuffs to be singled out are those of the formula (3)
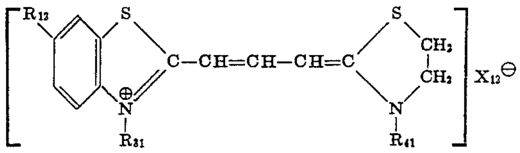

wherein $R_{12}$ denotes a methyl or ethyl group, $X_{12}$ denotes a bromide, iodide or perchlorate ion and $R_{31}$ and $R_{41}$ have the indicated meaning, as well as dyestuffs of the formula (4)
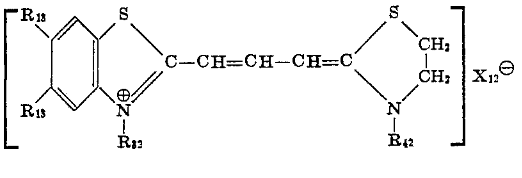

wherein both $R_{13}$ denote hydrogen atoms or methyl groups or one $R_{13}$ denotes a hydrogen atom and the other a chlorine atom, a bromine atom, a methyl group or an ethyl group, $R_{32}$ denotes an alkyl group with at most 8 carbon atoms or an alkylcarboxylic acid group with 2 or 3 carbon atoms, $R_{42}$ denotes an alkyl group with at most 2 carbon atoms or a hydroxyalkyl group with 2 or 3 carbon atoms and $X_{12}$ has the indicated meaning.

The dyestuff of the formula (5)

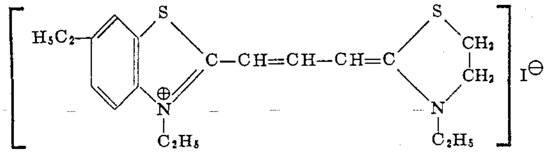

is particularly preferred.

Certain dyestuffs of the formula (1) are known and such dyestuffs can be manufactured according to known methods (see US Patent Specification 2,307,916).

Filters of the composition according to the invention can be used without noticeable damage for numerous exposures, in some cases for a total exposure time of 24 hours. The copies produced with the aid of such a filter on transparent or opaque silver dye bleach copying materials show a better separation of the colour shades than can be achieved with known filters of which the absorption band is broader, spectrally smudged or of a different shape.

The filter according to the invention preferably has an optical density of 0.5 to 2.0. It can be in the form of a self-supporting film or be cast onto any desired transparent carrier such as glass, cellulose triacetate or polyester. It may also be appropriate to locate it between two transparent carrier layers. Thus, for example, a covering layer of polyvinyl alcohol, which can contain a UV-absorber, can be applied to the filter layer. If appropriate, a carrier consisting of organic material can also contain a UV-absorber, in which case the carrier is turned towards the light source during use.

EXAMPLE 1

Figure 4:
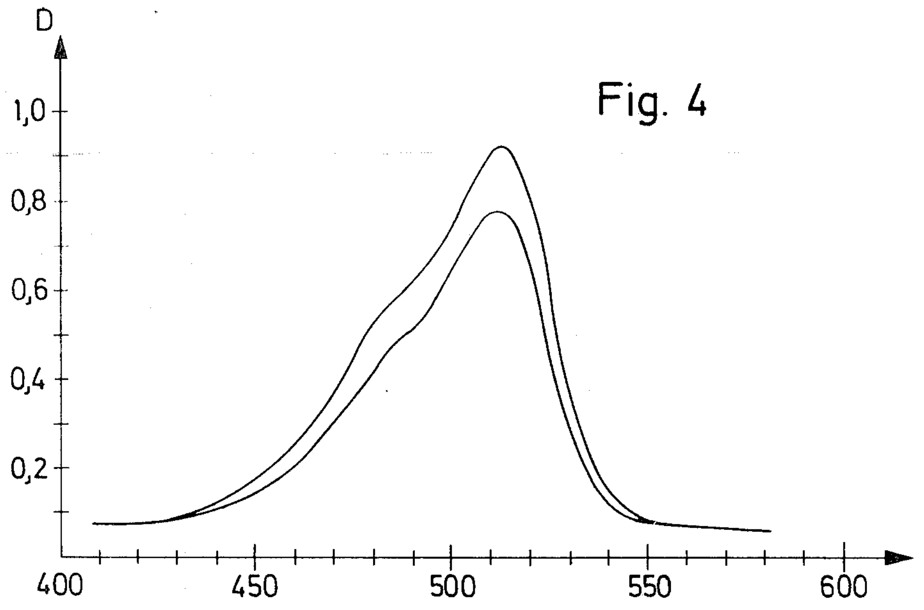

2 litres of a 5% strength aqueous solution are prepared from a low-viscosity, so-called fully saponified polyvinyl alcohol possessing the following properties Viscosity according to DIN 53,015 — 4 ± 1 cp
Degree of hydrolysis — 98.5 ± 0.5
Ester number — 20 ± 5
Residual acetyl content — 1.5 ± 0.4
Ash — 0.5 percent and 33 ml of a 2 percent strength methanolic solution of the light filter dyestuff of the formula (5) as well as 200 ml of a 3.4 percent strength aqueous sodium borate solution and 12 ml of a 5 percent strength aqueous saponin solution are added at 40°C, whilst stirring. Thereafter the mixture is filtered and the viscosity is adjusted to 9.2 cp by adding water. The pH value of the resulting ready-to-cast mixture is 8.2. A layer of 7.5$\mu$ (in the dry state) is produced on a photographic transparent layer carrier, for example a carrier of cellulose acetate, at a casting temperature of 40°C and a casting speed of 9 m/minute. An identical casting mixture without addition of the filter dyestuff is manufactured analogously. This second casting mixture is cast, as a protective layer of the same thickness, on top of the filter layer. The optical density of the filter thus manufactured is 0.95, measured from the transmitted light at the absorption maximum. The absorption curve is represented in FIG. 4.

The fastness to light of the filter manufactured in this way is very high, as is shown by the following comparison experiments: the filter was inserted into a commercially available enlargement apparatus for the production of colour copies and for this purpose it was introduced into the drawer provided for receiving colour filters. At an illumination intensity of about 2,000 Lux in the filter plane, the filter was exposed to 4,000 exposures, with the individual exposure time being 14 seconds and a pause of 14 seconds being maintained after each exposure. After these 4,000 exposures the filter with the dyestuff embedded in the polyvinyl alcohol showed a decrease in density of 11 percent (FIG. 4).

Figure 5:
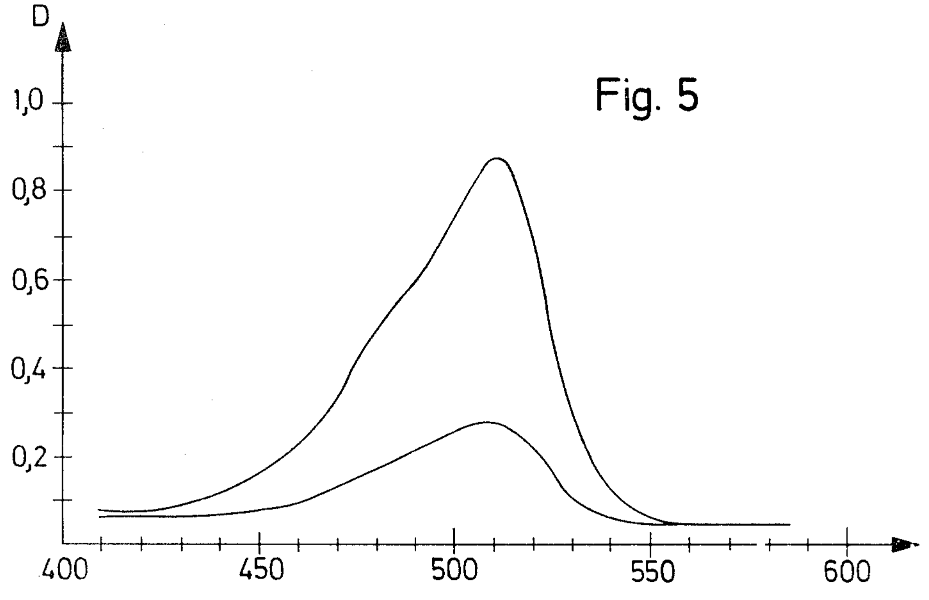

A filter manufactured by way of comparison with the same dyestuff in the indicated concentration, but cast in gelatine and not in polyvinyl alcohol, underwent a loss in density of 68 percent after 4,000 exposures under the identical conditions (FIG. 5). If instead of the dyestuff of the formula (5) the dyestuffs of the formula (2)

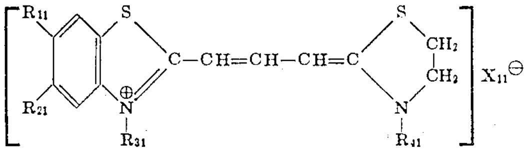

listed in the table which follows are used and in other respects the indicated procedure is followed, similar results are obtained.

TABLE

| No. | $R_{11}$ | $R_{21}$ | $R_{31}$ | $R_{41}$ | $X_{11}^{\ominus}$ | λmax. (methanol) |
|---|---|---|---|---|---|---|
| 1 | $C_2H_5$ | H | $C_2H_5$ | $C_2H_5$ | $I^{\ominus}$ | 502 |
| 2 | H | H | $C_2H_5$ | $C_2H_5$ | $I^{\ominus}$ | 498 |
| 3 | H | H | $C_2H_5$ | $C_2H_5$ | $ClO_4^{\ominus}$ | 498 |
| 4 | Br | H | $C_2H_5$ | $C_2H_5$ | $ClO_4^{\ominus}$ | 501 |
| 5 | H | H | n-$C_8H_{17}$ | $C_2H_5$ | $ClO_4^{\ominus}$ | 499 |
| 6 | H | Cl | $CH_2-CH_2-COOH$ | $C_2H_5$ | $I^{\ominus}$ | 502 |
| 7 | $CH_3$ | $CH_3$ | $CH_2-CH_2-COOH$ | $C_2H_5$ | $I^{\ominus}$ | 508 |
| 8 | H | H | $CH_3$ | $(CH_2)_3-OH$ | $Br^{\ominus}$ | 503 |
| 9 | $CH_3$ | H | $C_2H_5$ | $C_2H_5$ | $I^{\ominus}$ | 502 |
| 10 | H | $CH_3$ | $C_2H_5$ | $C_2H_5$ | $I^{\ominus}$ | 502 |

If the procedure described above is followed but instead of the abovementioned dyestuffs those which possess the same cation as described in formulae 1 – 10 but of which the anion $X^-$ is a chloride, benzenesulphonate, p-toluene-sulphonate, ethylsulphate, methylsulphate, tetrafluoborate, tetrafluotitanate, hexafluoantimonate, hexachlorostannate, hexachloroantimonate, tetrachloroaurate, tetrachloroaluminate or tetrachloroferrate anion, analogous results are obtained.

EXAMPLE 2

A copying material for the silver dye bleach process is prepared on a transparent carrier. In the layer sensitive to red the material contains the cyan image dyestuff of the formula

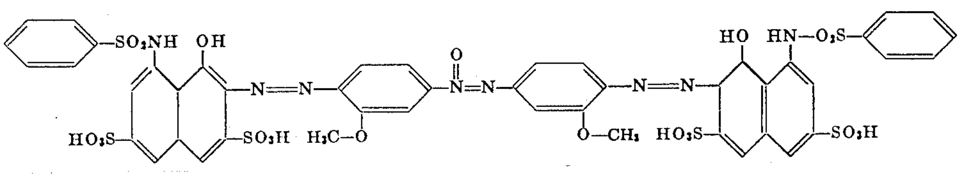

in the layer sensitive to green it contains the magenta image dyestuff of the formula

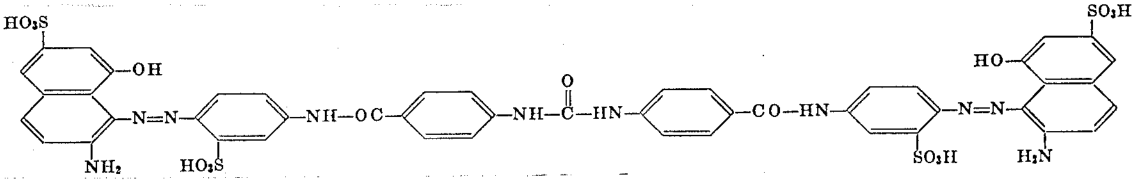

and in the layer sensitive to blue it contains the yellow image dyestuff of the formula

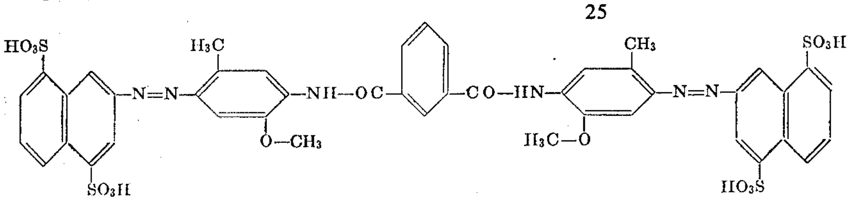

The same silver bromide-iodide emulsion is used for all light-sensitive gelatine layers. The individual layers are sensitised with the following dyestuffs:

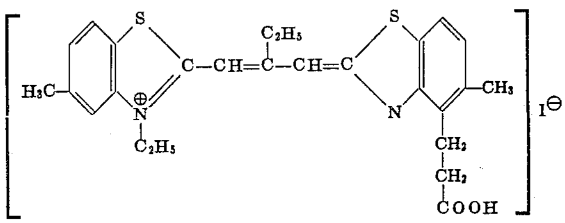

Red sensitiser

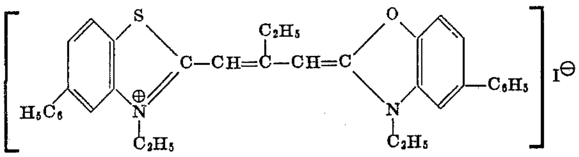

Figure 3:
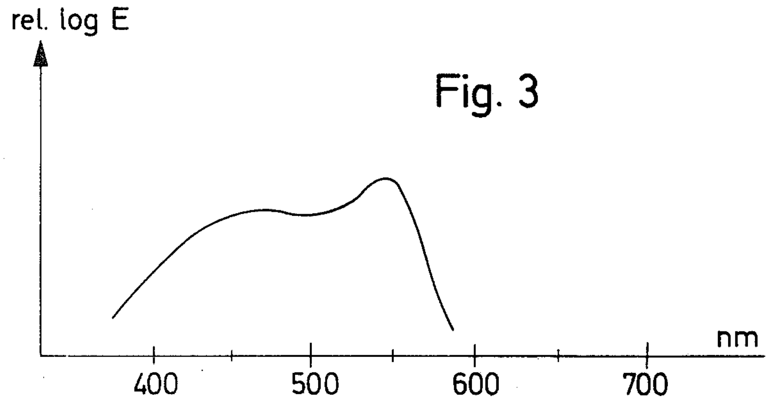

Green sensitiser (sensitisation curve: Figure 3)

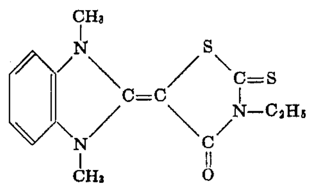

Blue sensitiser

This material is exposed in a wedge spectrograph (grey wedge) under the copying filter according to Example 1 and is then processed in the usual manner by the silver dye bleach process.

Figure 2:
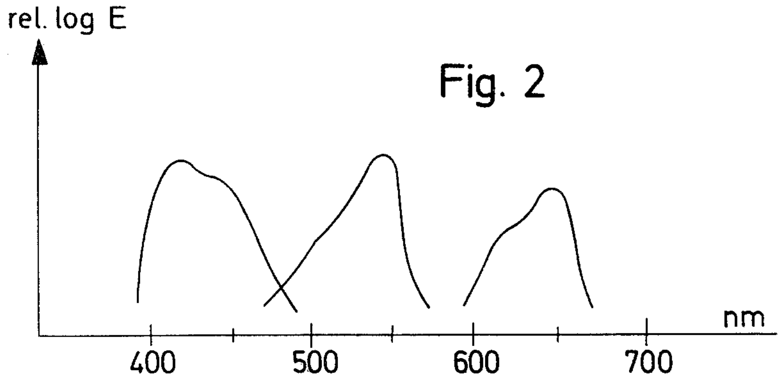

The difference between the image thus obtained and a corresponding image which has been produced without using the copying filter but otherwise in exactly the manner can be seen from FIGS. 1 and 2. It is clearly recognisable that the green and the red spectral region are well separated in both cases (FIG. 1 and 2). In the case of the exposure without the copying filter the sensitivites between the blue and the green spectral range overlap greatly (FIG. 1). The undesired high sensitivity of the layer sensitive to blue, containing the yellow image dyestuff, is caused by the emulsion containing silver iodide and by the presence of a blue sensitiser. The sensitivity in this spectral region is additionally favoured by the yellow image dyestuff which no longer absorbs sufficiently in this region.

The unfavourable sensitivity distribution in the layer sensitive to green results from the co-operation of the embedded magenta dyestuff with the green sensitiser. A particularly objectionable factor is the sensitivity at 500 to 510 nm being too high in comparison to the sensitivity at 550 nm.

On exposure using the copying filter according to Example 1 (FIG. 2) it can be seen clearly that both the excessively long-wavelength part of the layer sensitive to blue and the excessively short-wavelength part of the layer sensitive to green are corrected. This also eliminates the colour shifts caused by the excessive overlap in the blue and green spectrum region when producing colour copies by the subtractive copying method.

We claim:

1. Optical filter layer the substrate of which consists substantially of polyvinyl alcohol which layer contains a filter dyestuff of the formula

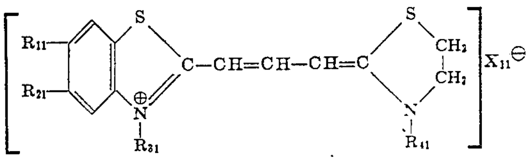

wherein $R_1$ and $R_2$, independently of one another, denote a hydrogen atom, an alkyl group with at most 4 carbon atoms or a halogen atom, $R_3$ and $R_4$, independently of one another, each denote a hydrocarbon radical which is optionally substituted further and $X_1$ denotes an anion.

2. Optical filter layer according to claim 1, the filter dyestuff of which corresponds to the formula

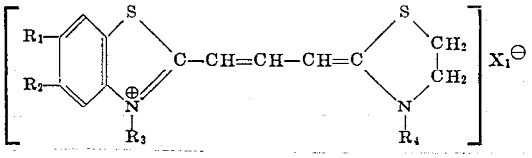

wherein $R_{11}$ and $R_{21}$, independently of one another, denote a hydrogen atom, a methyl group, an ethyl group, a chlorine atom or a bromine atom, $R_{31}$ and $R_{41}$, independently of one another, denote an alkyl group with at most 18 carbon atoms, a lower hydroxyalkyl group or alkylcarboxylic acid group and $X_{11}$ denotes a chloride, bromide, iodide or perchlorate ion.

3. Optical filter layer according to claim 2, the filter dyestuff of which corresponds to the formula

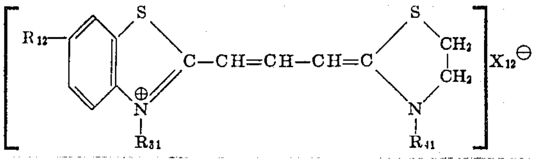

wherein $R_{11}$ denotes a methyl or ethyl group, $X_{12}$ denotes a bromide, iodide or perchlorate ion and $R_{31}$ and $R_{41}$ have the meanings given in claim 2.

4. Optical filter layer according to claim 2, the filter dyestuff of which corresponds to the formula

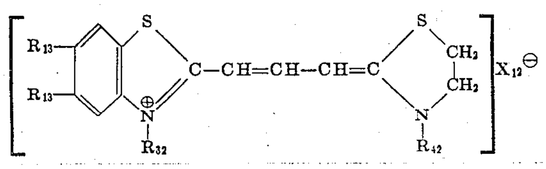

wherein both $R_{13}$ denote hydrogen atoms or methyl groups or one $R_{13}$ denotes a hydrogen atom and the other a chlorine atom, a bromine atom, a methyl group or an ethyl group, $R_{32}$ denotes an alkyl group with at most 8 carbon atoms or an alkylcarboxylic acid group with 2 or 3 carbon atoms, $R_{42}$ denotes an alkyl group with at most 2 carbon atoms or a hydroxyalkyl group with 2 or 3 carbon atoms and $X_{12}$ denotes a bromide, iodide or perchorate ion

5. Optical filter layer according to claim 4, the filter dyestuff of which corresponds to the formula

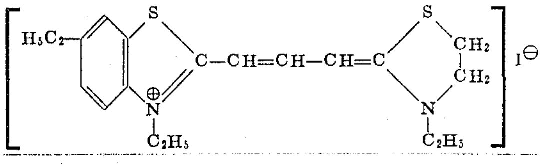

6. Optical filter layer according to claim 1, the substrate of which consists of a polyvinyl alcohol retaining at most 3 percent of acetyl groups.

7. Optical filter layer according to claim 6, the substrate of which consists of a polyvinyl alcohol which has been treated with a gelling agent.

* * * * *

UNITED STATES PATENT OFFICE
CERTIFICATE OF CORRECTION

Patent No. 3,779,937 Dated December 18, 1973

Inventor(s) RAINER KITZING ET AL

It is certified that error appears in the above-identified patent and that said Letters Patent are hereby corrected as shown below:

Change the formula in claim 1 to read as follows:

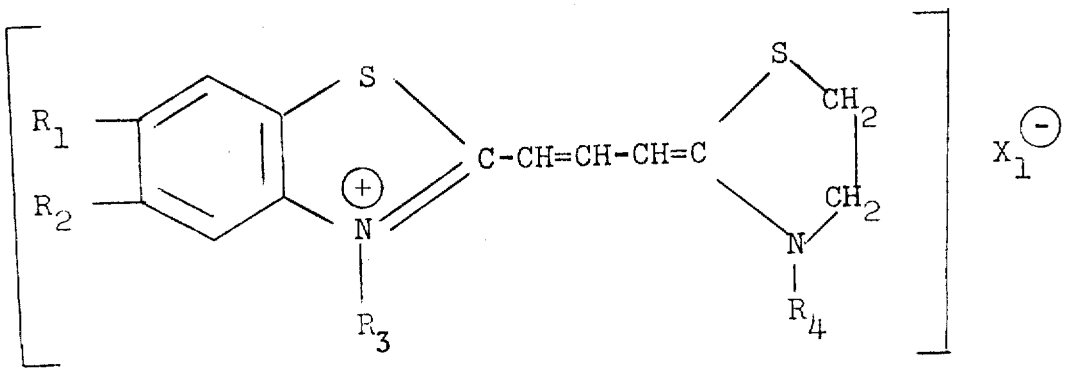

Change the formula in claim 2 to read as follows:

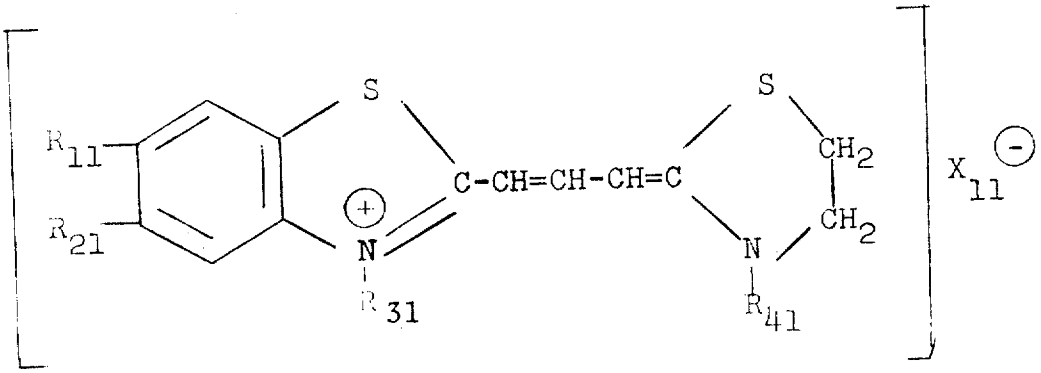

UNITED STATES PATENT OFFICE
CERTIFICATE OF CORRECTION

Patent No. 3,779,937 Dated December 18, 1973

Inventor(s) RAINER KITZING ET AL Page - 2

It is certified that error appears in the above-identified patent and that said Letters Patent are hereby corrected as shown below:

In column 7, claim 3, change the left-hand portion of the structural formula to read as follows:

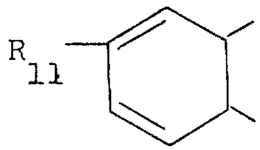

Signed and sealed this 24th day of December 1974.

(SEAL)
Attest:

McCOY M. GIBSON JR.
Attesting Officer

C. MARSHALL DANN
Commissioner of Patents